(12) United States Patent
Kawano et al.

(10) Patent No.: US 6,208,363 B1
(45) Date of Patent: Mar. 27, 2001

(54) MULTIPLE-IMAGE FORMING APPARATUS CAPABLE OF CORRECTING COLOR SHIFTS

(75) Inventors: Yuhzou Kawano, Ogori; Yoshiaki Ijima, Dazaifu; Jun-ichi Tanizaki, Fukuoka-ken; Masaya Shimada, Onojo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/395,196

(22) Filed: Sep. 14, 1999

(30) Foreign Application Priority Data

Sep. 21, 1998 (JP) .................................................. 10-266190

(51) Int. Cl.[7] .......................... G03G 15/01; G03G 15/04
(52) U.S. Cl. .......................... 347/116; 347/232; 347/234
(58) Field of Search .......................... 399/299, 301, 399/302; 347/116, 118, 232, 234, 248; 358/481, 489

(56) References Cited

U.S. PATENT DOCUMENTS 5,508,789 * 4/1996 Castelli et al. .......................... 399/8
5,995,802 * 11/1999 Mori et al. .......................... 399/394

FOREIGN PATENT DOCUMENTS 11-102100 * 4/1999 (JP) .

* cited by examiner

Primary Examiner—Joan Pendegrass
(74) Attorney, Agent, or Firm—Stevens, Davis, Miller & Mosher, L.L.P.

(57) ABSTRACT

An exposure apparatus is set to each color so that latent-image lines formed on photosensitive drums $1a$ to $1d$ have predetermined inclinations from rotation axes of the photosensitive drums $1a$ to $1d$ to form electrostatic latent images on the photosensitive drums $1a$ to $1d$ while performing curve correction on the photosensitive drums $1a$ to $1d$. Peripheral speeds of the photosensitive drums $1a$ to $1d$ are controlled so that inclinations of toner images of a plurality of colors on an intermediate transfer belt become equal to each other. Thereby, each pixel is not shifted when light-scanning images are superimposed each other by the exposure apparatus 3 and it is possible to obtain a high-quality image free from image deterioration due to scanning irregularity caused by inclination shifts of scanning lines 3K, 3C, 3M, and 3Y.

12 Claims, 6 Drawing Sheets

MULTIPLE-IMAGE FORMING APPARATUS CAPABLE OF CORRECTING COLOR SHIFTS

BACKGROUND OF THE INVENTION

1. Field of the Invention

The present invention relates to a multiple-image forming apparatus for forming a synthetic image by superimposing image information on a transfer material through the electrophotography or the like.

2. Description of the Related Art

In the case of an image forming apparatus using the electrophotography, it has been performed so far to electrify an electrophotographic photosensitive body serving as an image bearing body by an electrifier, irradiate the photosensitive body with light in accordance with image information to form a latent image, develop the latent image by a development device, transfer an actualized toner image to a sheet material or the like, and form an image.

Moreover, as the number of color images has been increased, a tandem-type image forming apparatus is also proposed which forms a full-color image by preparing a plurality of image bearing bodies in which a series of the above processes is developed, forming a cyanogen image, a magenta image, a yellow image, and preferably a black image on each image bearing body, superimposing the color images at the transfer position of each image bearing body, and transferring them to a sheet material.

The above tandem-type multiple-image forming apparatus is advantageous for speed-up because it has an image forming section for each color.

However, it is a technical problem how to smoothly perform the alignment (registration) of images formed in different image forming sections.

This is because shifts of image forming positions of four colors transferred to a sheet material finally appear as color shifts or a change of color tones.

FIGS. 5A to 5D show types of positional shifts of a transferred image.

Figure 5A:
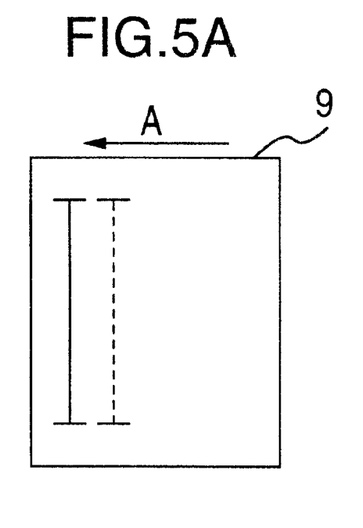
FIGS. 5A to 5D are illustrations showing types of positional shifts of a transferred image.
Figure 5B:
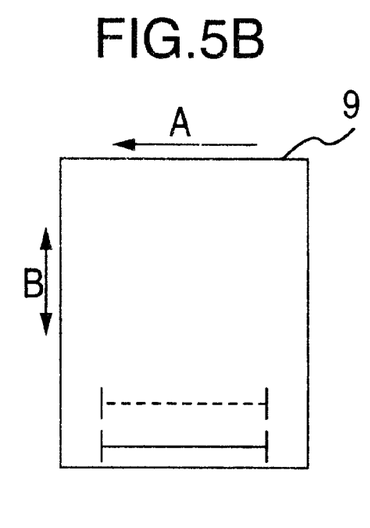

As shown in FIGS. 5A–5D, types of positional shifts of a transferred image include a positional shift (top margin) in the scanning-line write direction (direction of the arrow A in FIGS. 5A–5D) against a transfer material 9 (FIG. 5A), a positional shift (left margin) in the scanning direction (direction of the arrow B perpendicular to the direction of the arrow A in FIG. 5B, which is the scanning-line write direction) (FIG. 5B), a positional shift in the diagonal direction (FIG. 5C), and a shift of a magnification error (FIG. 5D), and actually, a shift obtained by superimposing these four types of shifts appears.

Figure 5C:
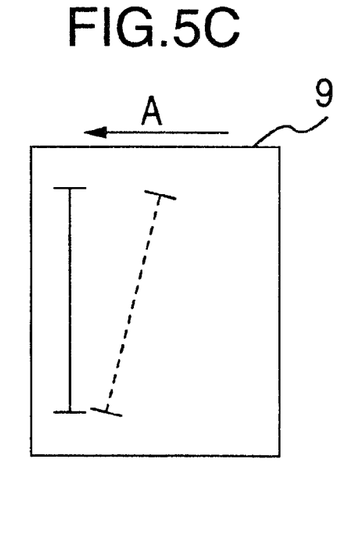
Figure 5D:
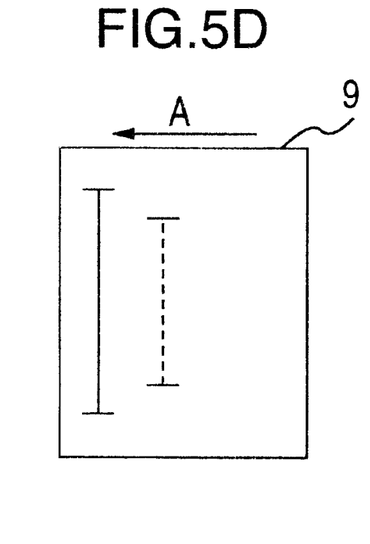

Moreover, the main cause of an image shift is a shift of the image write out timing of each image-forming station in the case of the top margin shown in FIG. 5A, and a shift of each image write timing of each image-forming station, that is, a shift of the scanning-start timing in one scanning line in the case of the left margin shown in FIG. 5B. Moreover, the inclination shift in the diagonal direction shown in FIG. 5C is a shift of a scanning-optical-system setting angle or a shift of the angle of the rotation axis of a photo-sensitive drum, and the shift due to a magnification error shown in FIG. 5D is a shift of a scanning-line length due to an error of the optical path length from the scanning optical system of each image-forming station up to the photosensitive drum.

Figure 6:
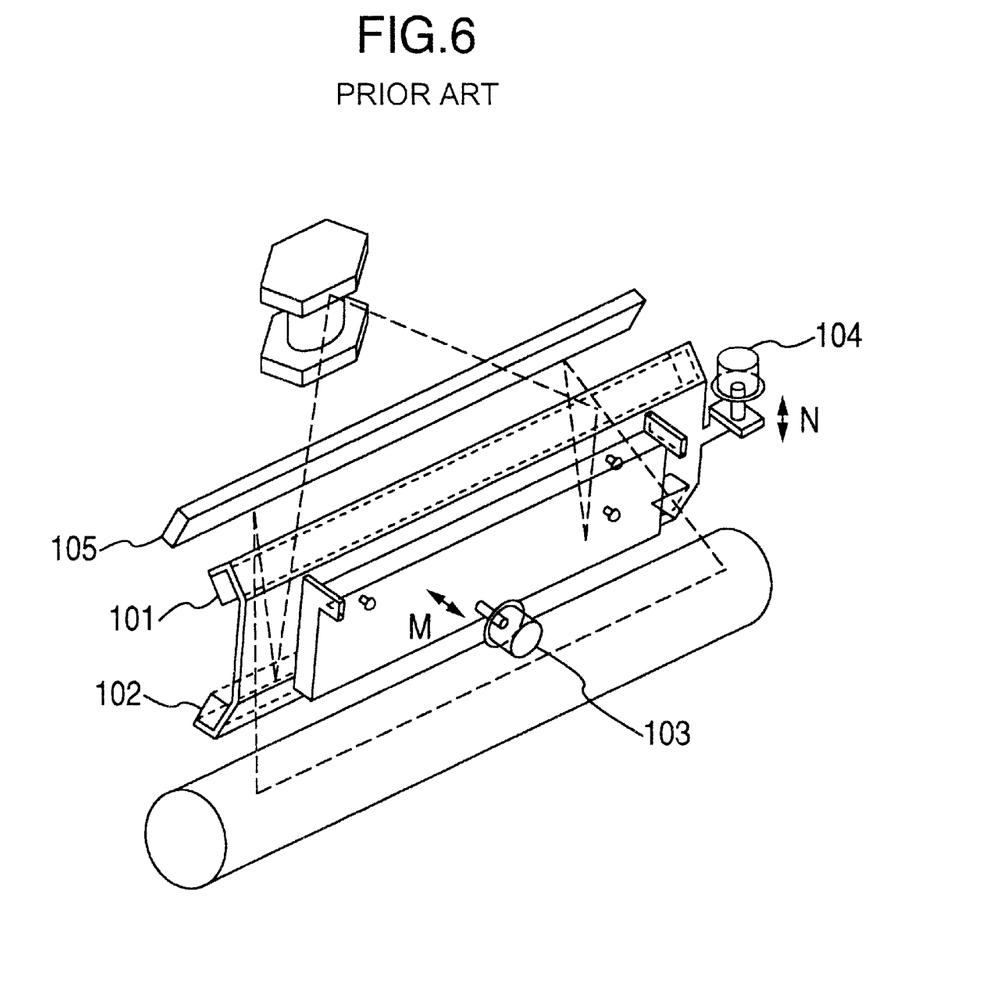
FIG. 6 is a perspective view showing the compensator of a conventional multiple-image forming apparatus.

To eliminate the above four types of shifts, the shifts are corrected by adjusting the scan timing of each color for the top margin and left margin. Moreover, the magnification error shift and inclination shift are corrected by the compensator of the conventional multiple-image forming apparatus shown in FIG. 6 by adjusting a pair of mirrors 101 and 102 whose mirror surfaces are perpendicularly held to each other and arranged almost at an angle similar to that of the character 'V', among three turn-back mirrors 101, 102, and 105 disposed in the midst of the optical path of each image-forming station, toward arrows M and N from the apparatus body respectively independently using actuators 103 and 104. In this case, a linear stepping actuator or the like provided with a stepping motor serving as a driving source linearly moving stepwise is used as actuators 103 and 104 for performing the above adjustment.

In the case of the above conventional multiple-image forming apparatus, however, because inclination-shift correction means is complex in configuration and uses many parts, vibrations easily occur. Therefore, the position of a scanning line irradiated onto a photosensitive body is moved to cause scanning irregularity and the scanning irregularity appears as the irregular density of an output image to extremely deteriorate the image quality.

Moreover, these problems greatly influence the formation of a high-quality image free from color shift by a digital color multiple-image forming apparatus.

Therefore, it is an object of the present invention to provide a multiple-image forming apparatus capable of preventing the image quality from deteriorating due to scanning irregularity caused by the inclination shift of a scanning line.

SUMMARY OF THE INVENTION

It is an object of the present invention to prevent the image quality of a multiple-image forming apparatus from deteriorating due to scanning irregularity caused by the inclination shift of a scanning line.

To achieve the above object, the present invention comprises electrification means for uniformly electrifying the surfaces of photosensitive drums $1a$ to $1d$, exposure means 3 which irradiates a scanning line corresponding to image data for specific colors and is arranged so that latent-image lines formed on the photosensitive drums $1a$ to $1d$ have predetermined inclinations from rotation axes of the photosensitive drums $1a$ to $1d$ to form an electrostatic latent image on the photosensitive drums $1a$ to $1d$ while performing curve correction on the photosensitive drums $1a$ to $1d$, development means $4a$ to $4d$ for actualizing electrostatic latent images, and transfer means for transferring monochromatic images formed on the photosensitive drums $1a$ to $1d$ by successively superimposing the images on an intermediate transfer belt, and controls the peripheral speed of the photosensitive drums $1a$ to $1d$ so that inclinations of toner images of a plurality of colors on the intermediate transfer belt become equal to each other.

DESCRIPTION OF THE PREFERRED EMBODIMENTS

Embodiments of the present invention are described below by referring to FIGS. 1 to 4. In these drawings, same members are provided with the same symbol and their repetitive description is omitted.

Figure 1:
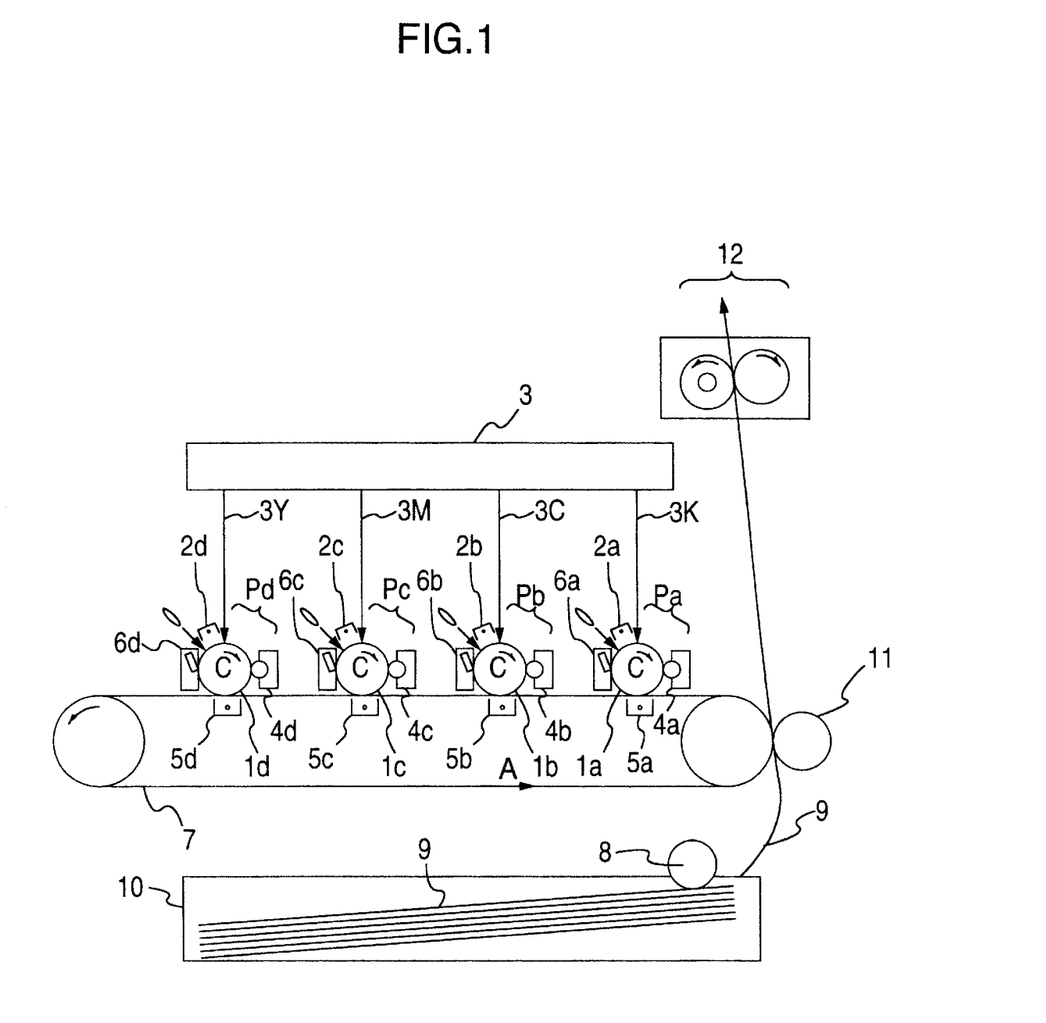
FIG. 1 is an illustration showing the configuration of the multiple-image forming apparatus of an embodiment of the present invention.
Figure 2:
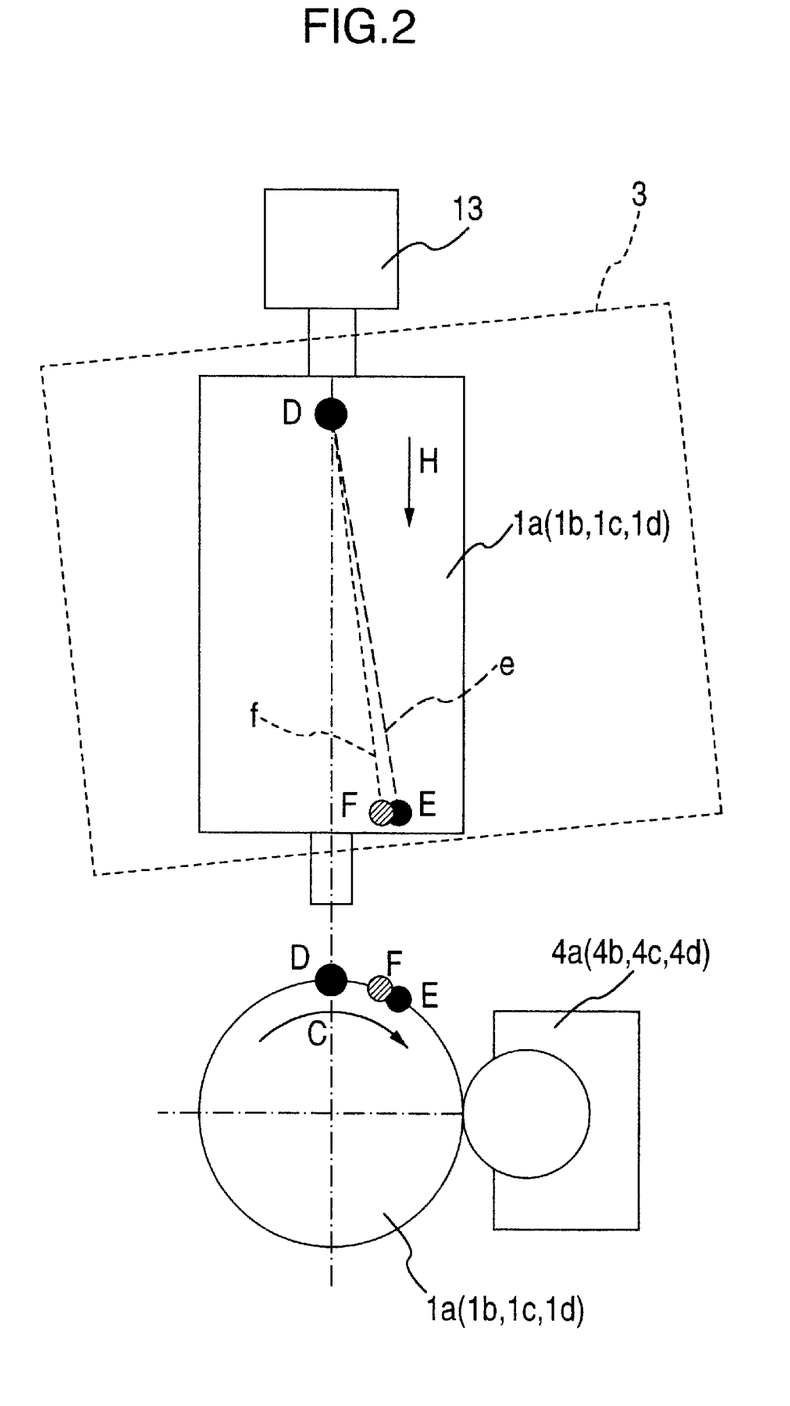
FIG. 2 is an illustration showing the relation between exposure means and a photosensitive drum of the multiple-image forming apparatus in FIG. 1.
Figure 3:
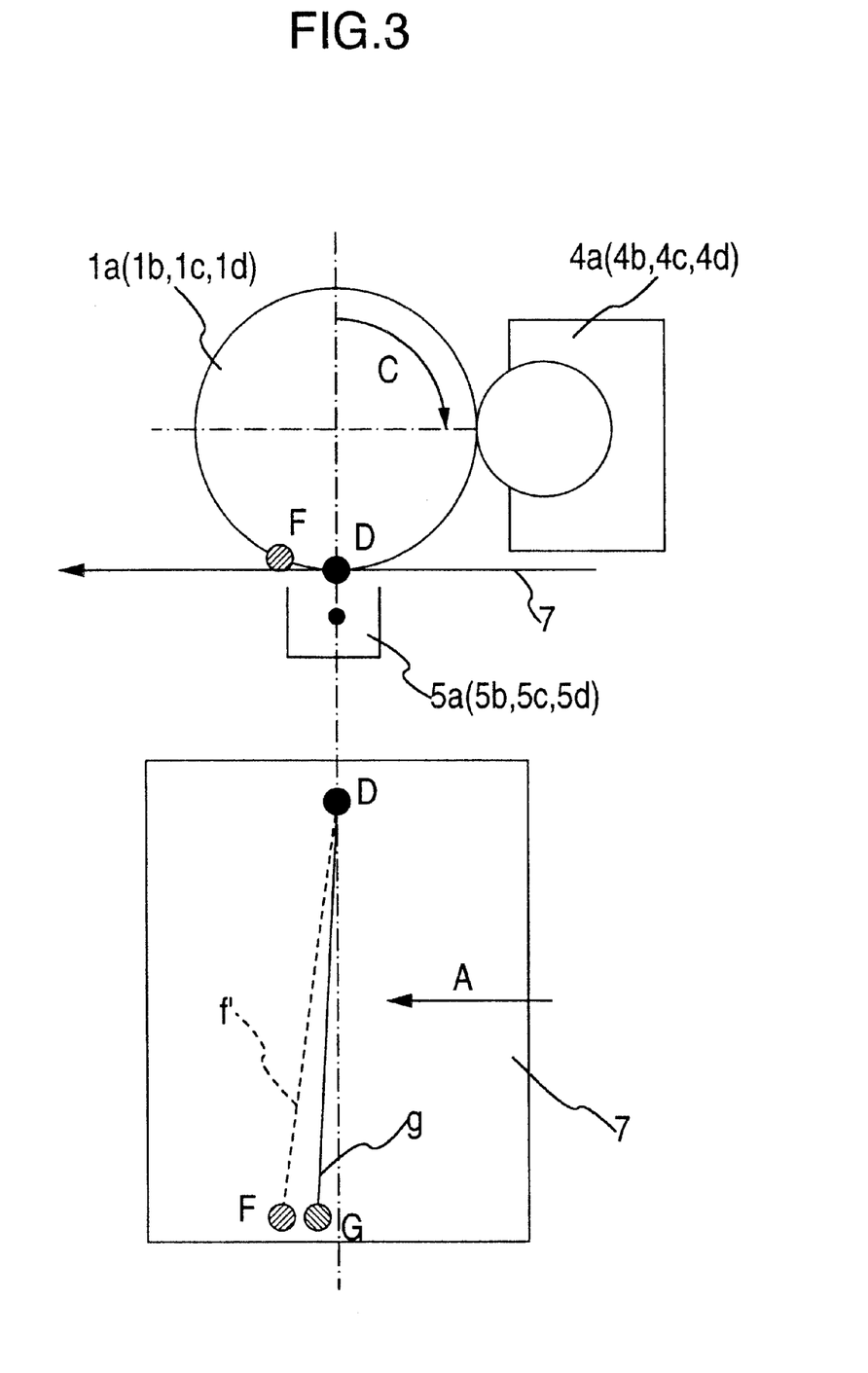
FIG. 3 is an illustration showing the relation between the photosensitive drum and an intermediate transfer belt of the multiple-image forming apparatus in FIG. 1.
Figure 4:
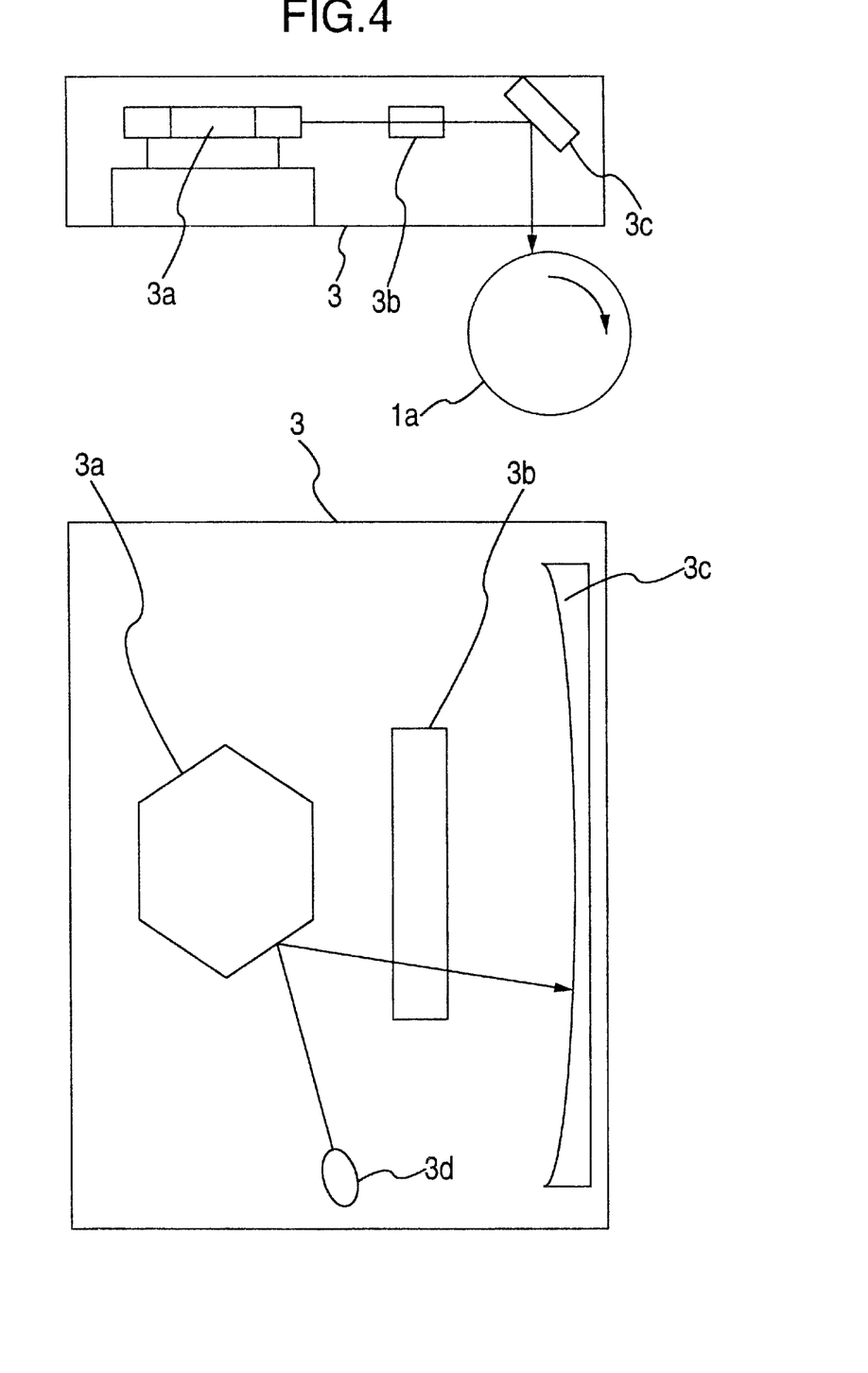
FIG. 4 is a schematic view showing the internal structure of exposure means of the multiple-image forming apparatus in FIG. 1.

FIG. 1 is an illustration showing the configuration of the multiple-image forming apparatus of an embodiment of the present invention, FIG. 2 is an illustration showing the relation between exposure means and a photosensitive drum of the multiple-image forming apparatus in FIG. 1, FIG. 3 is an illustration showing the relation between the photosensitive drum and an intermediate transfer belt of the multiple-image forming apparatus in FIG. 1, and FIG. 4 is a schematic view showing the internal structure of the exposure means of the multiple-image forming apparatus in FIG. 1.

As shown in FIG. 1, four image-forming stations Pa, Pb, Pc, and Pd are arranged in the multiple-image forming apparatus of this embodiment. Moreover, the image-forming stations Pa, Pb, Pc, and Pd have, respectively, photosensitive drums (photosensitive bodies) $1a$, $1b$, $1c$, and $1d$ serving as image bearing bodies. Electrification means $2a$, $2b$, $2c$, and $2d$, exposure means 3, development means $4a$, $4b$, $4c$, and $4d$, transfer means $5a$, $5b$, $5c$, and $5d$, and cleaning means $6a$, $6b$, $6c$, and $6d$ are arranged around the photosensitive drums $1a$, $1b$, $1c$, and $1a$. The electrification means $2a$, $2b$, $2c$, and $2d$ uniformly electrify each surface of the photosensitive drums $1a$, $1b$, $1c$, and $1d$ to a predetermined potential. The exposure means 3 forms an electrostatic latent image on the electrified photosensitive drums $1a$, $1b$, $1c$, and $1d$ by applying scanning lines 3K, 3C, 3M, and 3Y of laser beams corresponding to image data for specific colors onto the drums $1a$, $1b$, $1c$, and $1d$. The development means $4a$, $4b$, $4c$, and $4d$ actualize electrostatic latent images formed on the photosensitive drums $1a$, $1b$, $1c$, and $1d$. The transfer means $5a$, $5b$, $5c$, and $5d$ transfer the toner images actualized on the photosensitive drums $1a$, $1b$, $1c$, and $1d$ to an endless intermediate transfer belt (intermediate transfer body) 7. The cleaning means $6a$, $6b$, $6c$, and $6d$ transfer the toner images from the photosensitive drums $1a$, $1b$, $1c$, and $1d$ to the intermediate transfer belt 7 and thereafter, remove the toner remaining on the photosensitive drums $1a$, $1b$, $1c$, and $1d$.

In this case, the exposure means 3 is set so as to have a predetermined inclination from the photosensitive drums $1a$, $1b$, $1c$, and $1d$. Moreover, the intermediate transfer belt 7 rotates toward the arrow A in the illustrated case. Then, a black image, a cyanogen image, a magenta image, and a yellow image are formed on the image-forming stations Pa, Pb, Pc, and Pd one each. Then, monochromatic images of various colors formed on the photosensitive drums $1a$, $1b$, $1c$, and $1d$ are successively superimposed on the intermediate transfer belt 7 and transferred, and a full-color image is formed.

A sheet-material feed cassette 10 in which a sheet material 9 such as a printing sheet is stored is set to the bottom of the apparatus. Moreover, pieces of the sheet material 9 are delivered one by one to a sheet carrying route from the sheet feed cassette 10 by a sheet feed roller 8.

A sheet transfer roller 11 is set onto the sheet carrying route, which contacts the outer periphery of the intermediate transfer belt 7 over a predetermined range and transfers a color image formed on the intermediate transfer belt 7 to the sheet material 9. A fixing unit 12 fixes the color image transferred onto the sheet material 9 to the sheet material 9 by the pressure and heat due to the holding rotation of the roller.

In the case of the multiple-image forming apparatus having the above configuration, the electrification means $2a$ of the image-forming station Pa and the exposure means 3 first form a black-component latent image of image information on the photosensitive drum $1a$. The development means $4a$ having black toner visualizes the latent image as a black-toner image and the transfer means $5a$ transfers the image onto the intermediate transfer belt 7 as a black-toner image.

Moreover, while the black-toner image is transferred onto the intermediate transfer belt 7, the image-forming station Pb forms a cyanogen-component-color latent image and then, the development means $4b$ actualizes a cyanogen-toner image formed with cyanogen toner. Moreover, when the previous image station Pa completes transfer of the black-toner image, the transfer means $5b$ transfers the cyanogen-toner image to the image station Pb to superimpose the cyanogen-toner image on the black-toner image.

Hereafter, a magen a-toner image and a yellow-toner image are formed in the same manner. When superimposition of four-color toner images on the intermediate transfer belt 7 is completed, a sheet-material transfer roller 11 simultaneously transfers four color-toner images on the sheet material 9 fed from the sheet feed cassette 10 by the sheet feed roller 8. Then, the fixing unit 12 thermally fixes the transferred toner image to the sheet material 9 and thus, a full-color image is formed on the sheet material 9.

Finally, the cleaning means $6a$, $6b$, $6c$, and $6d$ remove remaining toner from the photosensitive drums $1a$, $1b$, $1c$, and $1d$ completing transfer to prepare for the next image formation to be continuously performed.

Thus, in the case of an apparatus having a plurality of image-forming stations Pa, Pb, Pc, and Pd, image information is exposed onto the photosensitive drums $1a$, $1b$, $1c$, and $1d$ rotating toward the arrow C in FIG. 1 by the scanning lines 3K, 3C, 3M, and 3Y of laser beams emitted from the exposure means 3, then visualized by the development means $4a$, $4b$, $4c$, and $4d$, and successively superimposed on and transferred to the same plane of the common intermediate transfer belt 7 rotating toward the arrow A in FIG. 1.

In this case, when the position of a transferred image on each of the image-forming stations Pa, Pb, Pc, and Pd is shifted from an ideal position, the positional shift appears as a shift or super-imposition of intervals between images of different colors occurs in the case of a multiple-color image. Moreover, in the case of a color image, the positional shift appears as a color-tone difference or when the positional shift further increases, it appears as a color shift and extremely deteriorates the quality of the image.

Therefore, this embodiment performs the following correction in order to eliminate positional shifts of four types of transferred images causing the color shift described for FIGS. 5A–5D.

That is, for a top margin and a left margin, a shift value is corrected by electrically adjusting scan timings of scanning lines 3K, 3C, 3M, and 3Y.

Moreover, for a magnification error shift, a shift value is corrected by electrically modulating video clock rates of the scanning lines 3K, 3C, 3M, and 3Y.

Furthermore, for a diagonal positional shift, that is, an inclination shift (skew), a shift value is corrected as described below. Though the following is described by using the scanning line 3K as an example, the same is true for the scanning lines 3C, 3M, and 3Y.

The upper side of FIG. 2 is an illustration drawn by viewing the photosensitive drum 1a from the upper side and the lower side of FIG. 2 is an illustration drawn by viewing the photosensitive drum 1a from the lateral side. A driving motor 13 rotates the photosensitive drum 1a of the image station Pa toward the arrow C. The peripheral speed (moving speed) of the surface of the photosensitive drum 1a is almost equal to the carrying speed (transfer speed) of the intermediate transfer belt 7. The scanning line 3K of a laser beam (FIG. 1) scans the surface of the photosensitive drum 1a from a scanning start point D up to a scanning end point E. However, because the photosensitive drum 1a also rotates toward the arrow C at the same time, a latent-image line e is formed which has a predetermined inclination from the direction (direction of the arrow H) perpendicular to the rotational direction of the photosensitive drum 1a.

By increasing the rotational speed of the driving motor 13 and thereby making the peripheral speed of the photosensitive drum 1a higher than the carrying speed of the intermediate transfer belt 7 (that is, the reference speed of the photosensitive drum 1a), the scanning end point moves from a point E up to a point F and a latent-image line f having a smaller tilt angle from the rotation axis of the photosensitive drum 1a is formed.

The development means 4a develops these latent-image lines by a development material such as toner to visualize the lines and the transfer means 5a transfers toner images to the intermediate transfer belt 7.

When making the peripheral speed of the photosensitive drum 1a higher than the carrying speed of the intermediate transfer belt 7, a line obtained by visualizing the latent-image line f shown in FIG. 2 becomes a transferred line g having a tilt angle smaller than that of a transferred line f' obtained when the peripheral speed of the photosensitive drum 1a is equal to the carrying speed of the intermediate transfer belt 7 from the rotation axis of the photosensitive drum 1a on the intermediate transfer belt 7, as shown in FIG. 3. However, by making the peripheral speed of the photosensitive drum 1a lower than the carrying speed of the intermediate transfer belt 7, the tilt angle from the rotation axis of the photosensitive drum 1a in the latent-image line and transferred line increases.

In the case of this embodiment, as shown in FIG. 2, the exposure means 3 is set so that the latent-image line e formed on the photosensitive drum 1a by the scanning line 3K irradiated from the exposure means 3 has a predetermined inclination from the rotation axis of the photosensitive drum 1a, in order to increase the coefficient of fluctuation of the inclination of the transferred line g to the change of peripheral speeds of the photosensitive drum 1a on the intermediate transfer belt 7.

In this case, increase of the coefficient of fluctuation of inclination is caused by the following reason. When forming the latent-image line f in parallel with the rotation axis of the photosensitive drum 1a, the transferred line g remains almost parallel with the rotation axis of the photosensitive drum 1a even if peripheral speeds of the photosensitive drum 1a are changed. However, when forming the latent-image line f diagonally to the rotation axis of the photosensitive drum 1a, inclinations of the transferred line g are changed if peripheral speeds of the photosensitive drum 1a are changed. Therefore, as the inclination of the latent-image line f from the rotation axis of the photosensitive drum 1a increases, the inclination of the transferred line g to the change of peripheral speeds of the photosensitive drum 1a increases on the intermediate transfer belt 7.

Moreover, because of forming the latent-image line e diagonally to the rotation axis of the photo-sensitive drum 1a, the coefficient of fluctuation of the inclination of the transferred line g to the change of peripheral speeds of the photosensitive drum 1a increases on the intermediate transfer belt 7. Therefore, by controlling the peripheral speed of the photosensitive drum 1a, it is possible to easily adjust the inclination shift of the transferred line g at a low cost.

Furthermore, as described for this embodiment, when the scanning end point F is brought to the downstream side of the scanning start point D in the rotational direction of the photosensitive drum 1a, the coefficient of fluctuation of the inclination of the scanning line 3K to the change of peripheral speeds of the photosensitive drum 1a increases on the intermediate transfer belt 7 when the peripheral speed of the photosensitive drum 1a is lower than the reference speed of the photosensitive drum 1a compared to the case in which the former speed is higher than the latter speed.

However, as shown in FIG. 2, because the latent-image line e formed on the photosensitive drum 1a is formed diagonally to the rotation axis of the photosensitive drum 1a, the curved shape of the photosensitive drum 1a is picked up to cause an image-surface curve.

Therefore, as shown in FIG. 4, a latent image is formed by leading a laser beam emitted from a laser diode 3d to a reflection mirror 3c through a polygon mirror 3a and a lens 3b and applying the laser beam to the photosensitive drum 1a. In this case, for example, by curving the reflection plane of the reflection mirror 3c correspondingly to the image-surface curve formed on the surface of the photosensitive drum 1a, it is possible to linearly correct a latent image formed on the photosensitive drum 1a. Moreover, curve correction can be made by the lens 3b. Therefore, by previously correcting an image-surface curve caused by picking up a curve on the photosensitive drum 1a in the exposure means 3, it is possible to form a linear latent image on the photosensitive drum 1a and obtain a high-quality output image.

Hereafter similarly, toner images of four colors are formed on the intermediate transfer belt 7 by changing inclinations of transferred lines and thereby forming a cyanogen image, a magenta image, and a yellow image.

Thus, according to the multiple-image forming apparatus of this embodiment, an inclination shift is corrected by setting the exposure means 3 as described above and controlling the peripheral speed of each of the photosensitive drums 1a, 1b, 1c, and 1d so that inclinations of transferred lines of various color images become equal to each other. Therefore, each pixel is not shifted by superimposing light-scanning images each other by the exposure means 3 and it is possible to obtain a high-quality image free from image deterioration due to scanning irregularity caused by inclination shifts of the scanning lines 3K, 3C, 3M, and 3Y.

As described above, according to the present invention, because each pixel is not shifted by superimposing light-scanning images by exposure means and therefore, an effective advantage can be obtained that it is possible to obtain a high-quality image free from image deterioration due to scanning irregularity caused by inclination shifts of scanning lines.

What is claimed is:

1. A multiple-image forming apparatus comprising:

optical means for scanning an image by emitting a beam of light modulated by image data; and a plurality of image bearing bodies each for receiving a latent image formed thereon by scanning of the optical means;

wherein each of said image bearing bodies has a rotation axis making a predetermined angle with respect to a direction of said scanning by the optical means.

2. The multiple-image forming apparatus according to claim 1, wherein the image bearing bodies are respectively provided for each of a plurality of color elements forming a color image.

3. A multiple-image forming apparatus comprising:

optical means for scanning an image by emitting a beam of light modulated by image data; and a plurality of image bearing bodies each for receiving a latent image formed thereon by scanning of the optical means; and drive control means for controlling a driving speed of each of the image bearing bodies;

wherein each of said image bearing bodies has a rotation axis making a predetermined angle with respect to a direction of said scanning by the optical means.

4. The multiple-image forming apparatus according to claim 3, wherein the image bearing bodies are respectively provided for each of a plurality of color elements forming a color image.

5. The multiple-image forming apparatus according to claim 3, wherein the image bearing bodies are respectively provided for each of a plurality of color elements forming a color image, and the drive control means controls a driving speed of each of the image bearing bodies.

6. A multiple-image forming apparatus comprising:

optical means for emitting a beam of light modulated by image data;

scanning means for deflecting the beam emitted from the optical means;

reflection means having a correcting surface for correcting distortion of an optical path of the beam deflected by the scanning means; and a plurality of image bearing bodies each for receiving a latent image formed thereon by scanning of the beam from the optical means after deflection by the reflection means.

7. The multiple-image forming apparatus according to claim 6, wherein each of said image bearing bodies has a rotation axis making a predetermined angle with respect to a direction of scanning by the optical means.

8. The multiple-image forming apparatus according to claim 6, wherein the image bearing bodies are respectively provided for each of a plurality of color elements forming a color image, and each of said image bearing bodies has a rotation axis making a predetermined angle with respect to a direction of scanning by the optical means.

9. A multiple-image forming apparatus comprising:

optical means for emitting a beam of light modulated by image data;

scanning means for deflecting the beam emitted from the optical means;

reflection means having a corrected surface for correcting distortion of an optical path of the beam deflected by the scanning means;

a plurality of image bearing bodies each for receiving a latent image formed thereon by scanning of the beam from the optical means after reflection by the reflection means; and drive control means for controlling a driving speed of each of the image bearing bodies.

10. The multiple-image forming apparatus according to claim 9, wherein each of said image bearing bodies has a rotation axis making a predetermined angle with respect to a direction of scanning by the optical means.

11. The multiple-image forming apparatus according to claim 9, wherein the image bearing bodies are respectively provided for each of a plurality of color elements forming a color image, and each of said image bearing bodies has a rotation axis making a predetermined angle with respect to a direction of scanning by the optical means.

12. The multiple-image forming apparatus according to claim 9, wherein the image bearing bodies are respectively provided for each of a plurality of color elements forming a color image, each of said image bearing bodies has a rotation axis making a predetermined angle with respect to a direction of scanning by the optical means, and the drive control means controls a driving speed of each of the image bearing bodies.

* * * * *